United States Patent [19]
DeLaine, Jr.

[11] Patent Number: 5,802,152
[45] Date of Patent: Sep. 1, 1998

[54] MODEM SPEED DIALER CIRCUIT

[76] Inventor: Phillip M. DeLaine, Jr., P.O. Box 1513, Lowell, Mass. 01853

[21] Appl. No.: 501,994

[22] Filed: Jul. 13, 1995

[51] Int. Cl.$^6$ .................................................. H04M 11/00
[52] U.S. Cl. .................... 379/93.26; 379/93.01; 379/355; 375/222
[58] Field of Search ................... 375/219–222, 375/377; 379/90, 93, 96, 98, 355, 387, 397, 399, 441, 354, 90.01, 93.01, 93.05, 93.26–93.36

[56] References Cited

U.S. PATENT DOCUMENTS

| | | |
|---|---|---|
| 4,723,267 | 2/1988 | Jones et al. ............ 379/93 |
| 4,860,342 | 8/1989 | Danner . |
| 5,003,580 | 3/1991 | Duong et al. ............ 379/93 |
| 5,375,165 | 12/1994 | Haber et al. ............ 379/90 |
| 5,553,122 | 9/1996 | Haber et al. ............ 379/90 |

OTHER PUBLICATIONS

Motorola, "Lifestyle 28.8 Data/Fax Modem", *User's Guide*, Doc. No. 6 209 5419 02 014, May 1996, Huntsville, Alabama.

*Primary Examiner*—Curtis A. Kuntz
*Assistant Examiner*—Stephen W. Palan
*Attorney, Agent, or Firm*—Foley, Hoag & Eliot LLP

[57] ABSTRACT

A modem speed dialer circuit, used in conjunction with a modem, controls operation of the phone jack of the modem to enable the modem to automatically change the on/off hook status of a connected telephone. For a computer user who only uses the modem for dialing purposes, this eliminates the need to manually change of the telephone on/off hook state between each telephone call. The user can leave the telephone handset or headset off hook while the modem electronically and automatically changes the handset or headset on/off hook state as the user processes successive telephone calls.

19 Claims, 8 Drawing Sheets

MODEM SPEED DIALER CIRCUIT

TECHNICAL FIELD

This application relates to the field of electronic communications and more particularly to the field of using a modem telephone dialing mechanism to facilitate communication.

BACKGROUND OF THE INVENTION

A modem is a data communications device used with a computer. The modem can be configured to operate either internal or external to the computer. An internal modem is usually constructed on an integrated circuit board that can be inserted inside and onto the bus of the computer. An external modem is also constructed on an integrated circuit board, but requires its own casing, power supply and electric cables which connect the modem to the computer via an external data connection means.

A modem begins a data transmission session by first dialing a telephone number of another computer specified by the computer user. Once a connection has been established, the modem starts transmission of data. The name "modem" is an acronym derived from the data conversion process performed by the modem when sending or receiving digital data. When the modem is sending data, it first converts the digital information into an analog signal through a process called "MOdulation". The analog signal is then transmitted over a telephone line to the receiving modem which converts the analog signal back into digital information by a process called "DEModulation".

In some instances, it is desirable to use the modem exclusively to dial telephone numbers. For example, telemarketers and other similar users use the modem's telephone number dialing ability along with computer software to automatically dial the telephone numbers of their clients and prospects. The user interacts with the software which issues appropriate commands to the modem to dial the desired telephone number. Using a modem as a dialer eliminates the need for the user to manually dial telephone numbers, thus saving time and increasing efficiency and productivity since the modem dials telephone numbers in a quick, efficient and accurate manner.

However, there are difficulties associated with using a modem to dial a telephone. Specifically, since the user's telephone handset and the modem are conventionally connected in parallel, the user is required to hang up both the modem (usually by issuing a software command) and to also hang up the handset (usually manually). As discussed in more detail below, it is often not sufficient to hang up just the modem to break the telephone connection.

A telephone handset is deemed to be in the "off hook" state when the handset of the telephone is removed from the telephone base to release a spring loaded lever called a "hook". The telephone handset is deemed to be in an "on hook" state when the handset has been placed on the telephone base to depress the spring loaded hook. The hook is connected inside the telephone base to an electrical contact mechanism that electronically switches the operational state of the telephone. Removing the handset off the telephone base, (the "off hook" state) releases the hook which electrically switches the telephone handset to an operable state that allows the user to establish a telephone connection. Placing the handset onto the telephone base on the hook (the "on hook" state) electronically switches the telephone handset to an inoperable state and the telephone is hung up. Even though the terms "on hook" and "off hook" suggest particular physical positions of the handset, the terms are used herein to indicate the electrical state of the telephone.

If a user does not place the telephone handset on hook at the end of a conversation, conventional modems are enable to successfully dial a new telephone number because the telephone line was not hung up from the previous telephone call. Hanging up the handset is required in order to completely break the previous connection and generate a dial tone for the next call. This required manual repositioning must also be timed in conjunction with the user entering software commands to dial successive telephone numbers. A user, with some ingenuity, could use his or her finger to press and release the hook to change the on/off hook state of the telephone, thus eliminating wasted motion. However, this can become cumbersome when making a large number of successive telephone calls.

Figure 1:
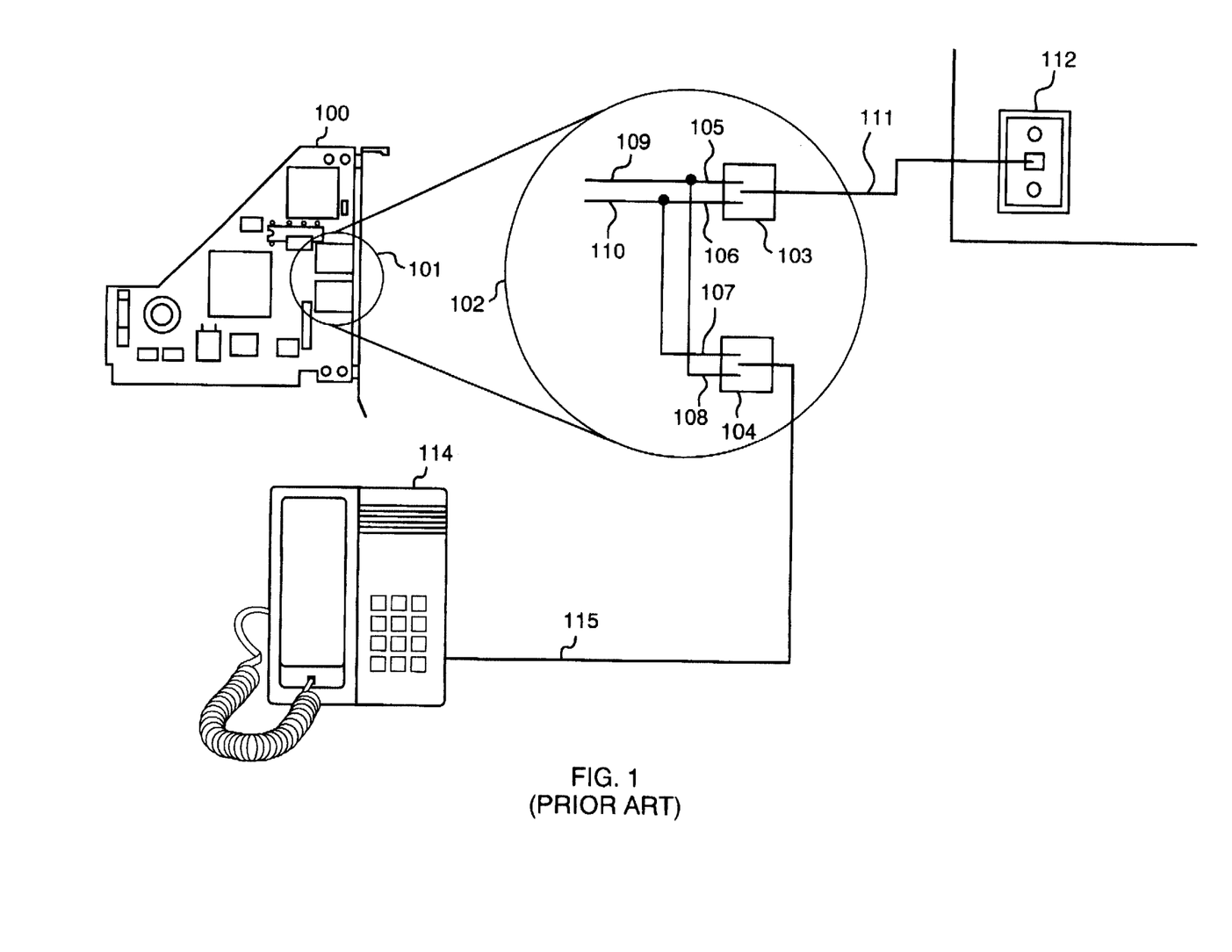
FIG. 1 shows a prior art configuration of a conventional modem and telephone connected in parallel to a telephone line.

FIG. 1 illustrates a conventional parallel connection between a modem 100 and a telephone 114. A view 102 shows in detail a phone jack 104 and a line jack 103 of the modem 100 and shows the interconnecting circuitry therebetween. The line jack 103 can be connected to a telephone wall jack 112 via a conventional RJ-11 cable 111. Circuitry connections 109, 110 are coupled to the cable 111 via two lines 105, 106.

A conventional modem such as the modem 100 shown in FIG. 1 has no ability to control operation of the phone jack 104. Two lines 107, 108 of the phone jack 104 are connected in parallel to the lines 106, 105 of the line jack 103. Therefore the modem 100 cannot control the operation of the phone jack 104 because the phone jack 104 is tied directly to the telephone line 111. Hanging up the modem 100 does not put the wall jack 112 in an on hook state unless the telephone 114 is also on hook. As described below, many attempts to overcome this difficulty are found in the prior art.

U.S. Pat. No. 4,367,374 to Serrano discloses a modem telephone interface circuit for coupling a telephone to a modem or similar device. The circuit uses manually-actuated switches to direct signals to/from the telephone, the modem, and a conventional telephone company line. In certain switch configurations, the user can use the telephone handset to listen to data being transmitted to and from the modem.

U.S. Pat. No. 4,392,023 to Sears discloses an off-hook telephone sensing system in which a conventional telephone instrument is coupled to an off-hook sensing circuit via a relay. During normal operation, the relay connects the telephone to the off-hook sensing circuit which senses the on/off hook state of the telephone. A modem is also connected to a conventional telephone line and to a communication controller. The off-hook sensing circuit senses the on/off hook state of the telephone and provides a signal to computer software indicate that the telephone has been placed off-hook while the modem is communicating data over the telephone line. When this occurs, the microprocessor and communications controller end the communication by the modem and allow the user, who has placed the telephone off-hook, to use the telephone in a normal manner. When the telephone is placed back on-hook, the off-hook sensing circuit senses this and provides signals to the computer software which reestablishes data communications by the modem over the telephone line.

U.S. Pat. No. 4,860,342 to Danner discloses a system for integrating a conventional telephone headset with a modem, both of which are connected to a single conventional telephone line. A telephone line interface control unit cooperates with a telephone line interface to connect either the modem or the headset to the telephone line. However, as shown in FIG. 3 of Danner and described in column 10 beginning at line 14 thereof, a microprocessor provides signals through a mux to relay drivers to control the on/off hook state of the headset. Accordingly, the device disclosed in Danner separately controls the on/off hook state of both the modem and the headset according to software programs used in conjunction with the device disclosed therein.

U.S. Pat. No. 4,987,586 to Gross et al. discloses an interface used to connect a modem and a conventional telephone to a telephone line. The interface includes a telephone off-hook detection circuit. The telephone off-hook detection circuit prevents the modem from assuming an off-hook condition when the telephone is in the off-hook state. The modem can be electrically disconnected from the telephone line or, alternatively, the telephone off-hook detection circuit can provide a signal to the modem indicating that the telephone handset/headset is in the off-hook state. The modem can be programmed to not access the telephone line when this signal is present.

SUMMARY OF THE INVENTION

According to the present invention, a modem speed dialer circuit includes a phone jack for receiving a cable connected to a telephone, a line jack for receiving a cable connected to a telephone wall jack, and a first switch, interposed between the telephone jack and the line jack. The switch is responsive to an on/off hook signal of a modem so that the phone jack is placed in an off hook state in response to the signal indicating that the modem is in an off hook state and the phone jack is placed in an on hook state in response to the signal indicating that the modem is in an on hook state.

The circuit can also include a second switch electrically interposed between the first switch and the line jack where the second switch is user actuateable to override operation of the first switch. The circuit can also include a balancing resistor to minimize the electrical loading effects of the phone circuitry. The resistor can be a five hundred ohm resistor. The modem can be an internal or external modem.

According further to the present invention, a modem speed dialing circuit includes a phone jack for receiving a cable connected to a telephone, a line jack for receiving a cable connected to a telephone wall jack, and a phone jack switch, interposed between the phone jack and the line jack. The phone jack switch is responsive to a first control signal to place the phone jack either in an off hook state or an on hook state. The circuit also includes an attenuation resistor interposed between the phone jack switch and the line jack and an attenuation switch, connected in parallel to the attenuation resistor where the attenuation switch opens in order to attenuate signals provided to the phone jack in response to a second control signal provided to the attenuation switch. One or more of the switches can be a relay, such as a mechanical relay.

The circuit can also include a modem hook relay having a first line connected to the line jack and the attenuation relay and having a second line connected to the line jack and the phone jack relay. The modem hook relay can close in response to a third control signal that is activated only when a telephone number is dialed.

The invention eliminates the need to manually place the telephone in the on and off hook states between successive telephone calls. Also, using the balancing resistor allows the electrical loading on the modem circuitry to be minimized. The attenuation resistor and attenuation switch provide additional benefits, such as attenuating touch-tone pulses heard by the user during dialing. Configuring the circuit to work with an internal or external modem provides additional flexibility.

DETAILED DESCRIPTION OF THE PREFERRED EMBODIMENTS

Figure 2:
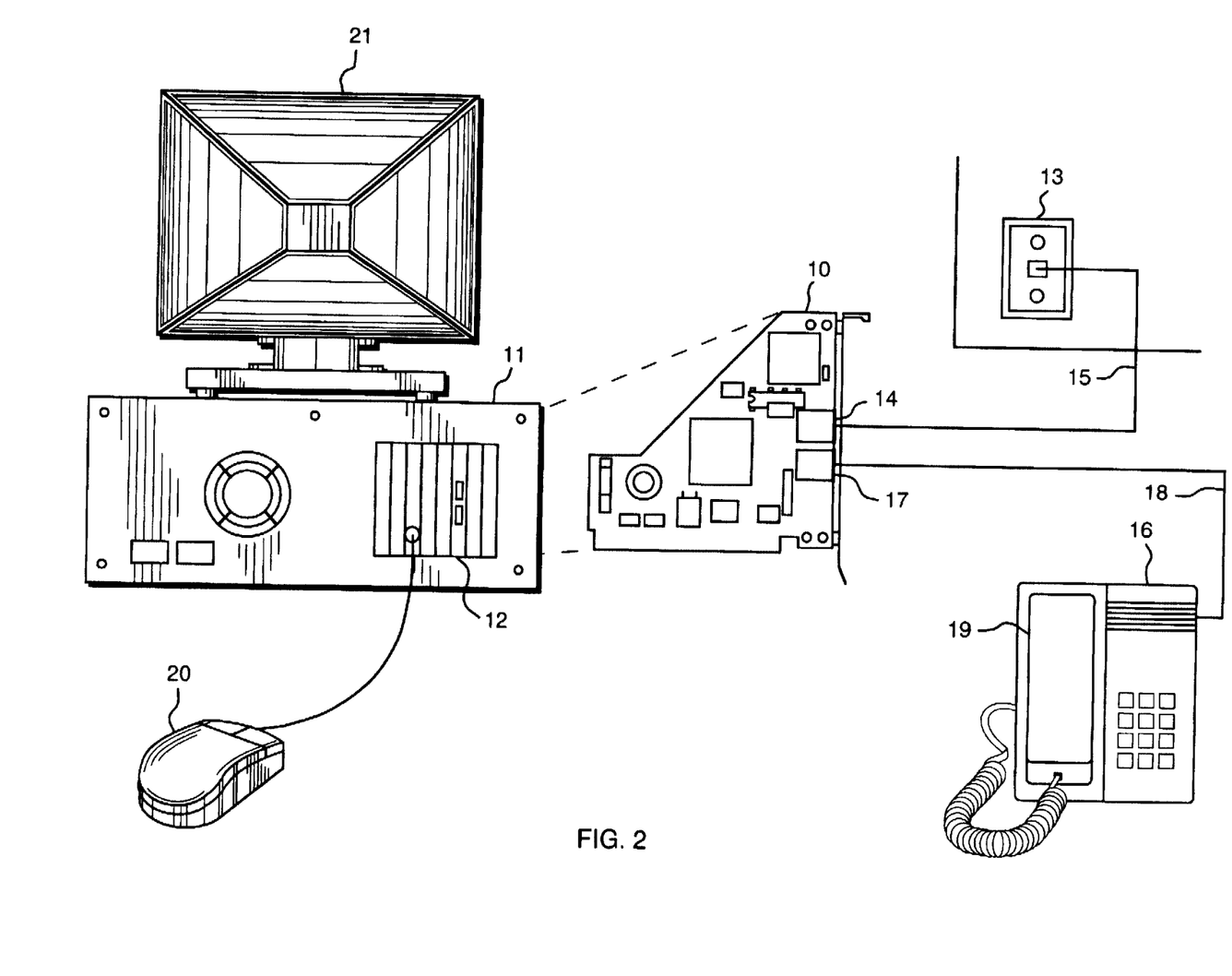
FIG. 2 shows a modem and telephone system according to the present invention.

Referring to FIG. 2, a computer workstation 11 is connected to a modem 10 and a telephone 16. The modem 10 can be an internal modem that is positioned inside the computer workstation 11 occupying a slot 12 of the computer workstation 11. The modem 10 can be connected, via an RJ-11 cable 15, from a line jack 14 of the modem 10 to a telephone wall jack 13. The modem 10 can also be connected, via an RJ-11 cable 18, from a phone jack 17 of the modem 10 to the telephone 16. A telephone handset 19 is part of the telephone 16. During operation, the telephone handset 19 would usually be positioned off hook continuously at the user's head. A conventional mouse 20 can be connected to the computer workstation 11 so that software programs which send commands to the modem 10 can be operated efficiently by clicking the appropriate controls or other items displayed on a monitor screen 21 of the computer workstation 11, as described in more detail below.

Figure 3:
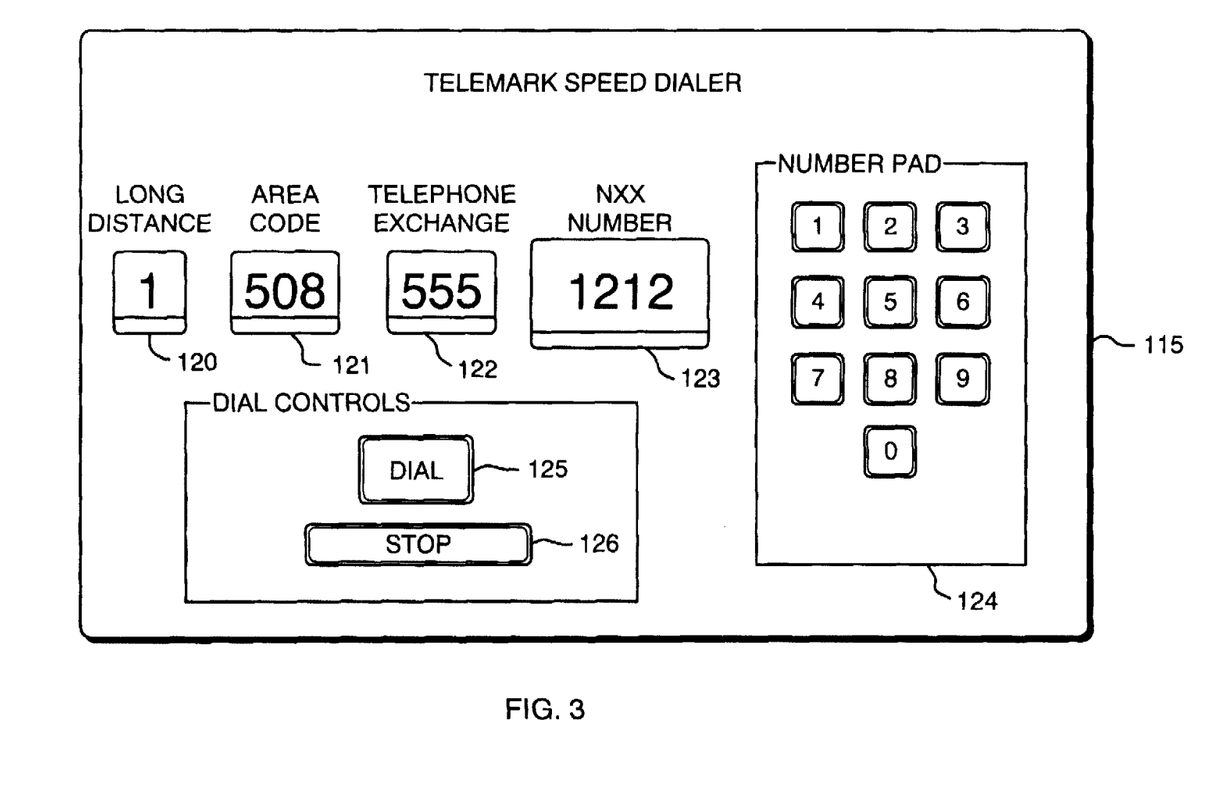
FIG. 3 shows a screen for software that controls a modem and telephone system according to the present invention.

FIG. 3 illustrates a screen display 115 for software that could be used to send telephone number dialing instructions to the modem. The software can be a Windows based program which dials any telephone number that is shown on the display 115. A phone number area has four sections: a Long Distance Section 120, an Area Code Section 121, a Telephone Exchange Section 122 and an Nxx Number Section 123. A telephone number to be dialed is specified by clicking the left mouse button on an appropriate one of the Sections 120–123 and clicking the desired numbers on a Number Pad 124. In this example, the telephone number "1 508 555 1212" has been entered into the phone number area.

When a Dial button 125 is clicked with the mouse, the software issues the following command to the modem: "ATM0DT15085551212". The six letters in this command come from what is known in the computer industry as the "AT Command Set", an industry standard for sending commands to and the controlling of compliant modems. The first two letters of the command, "AT", instruct the modem to come to attention. The next two letters, "M0", (that is "M" as in Mary and "0" as in the number zero) instruct the modem to turn off an internal speaker or functional equivalent. The last two letters, "DT", instruct the modem to go off hook and dial the telephone number using the standard tone system of dialing. The eleven numbers, "15085551212", are the numbers that the modem is instructed to dial. When the subsequent telephone conversation has ended, a Stop button 126 is clicked to issue the following command to the modem: "ATH". The "AT" portion of the command instructs the modem to come to attention and the "H" portion instructs the modem to go on hook, i.e., to hang-up.

Figure 4:
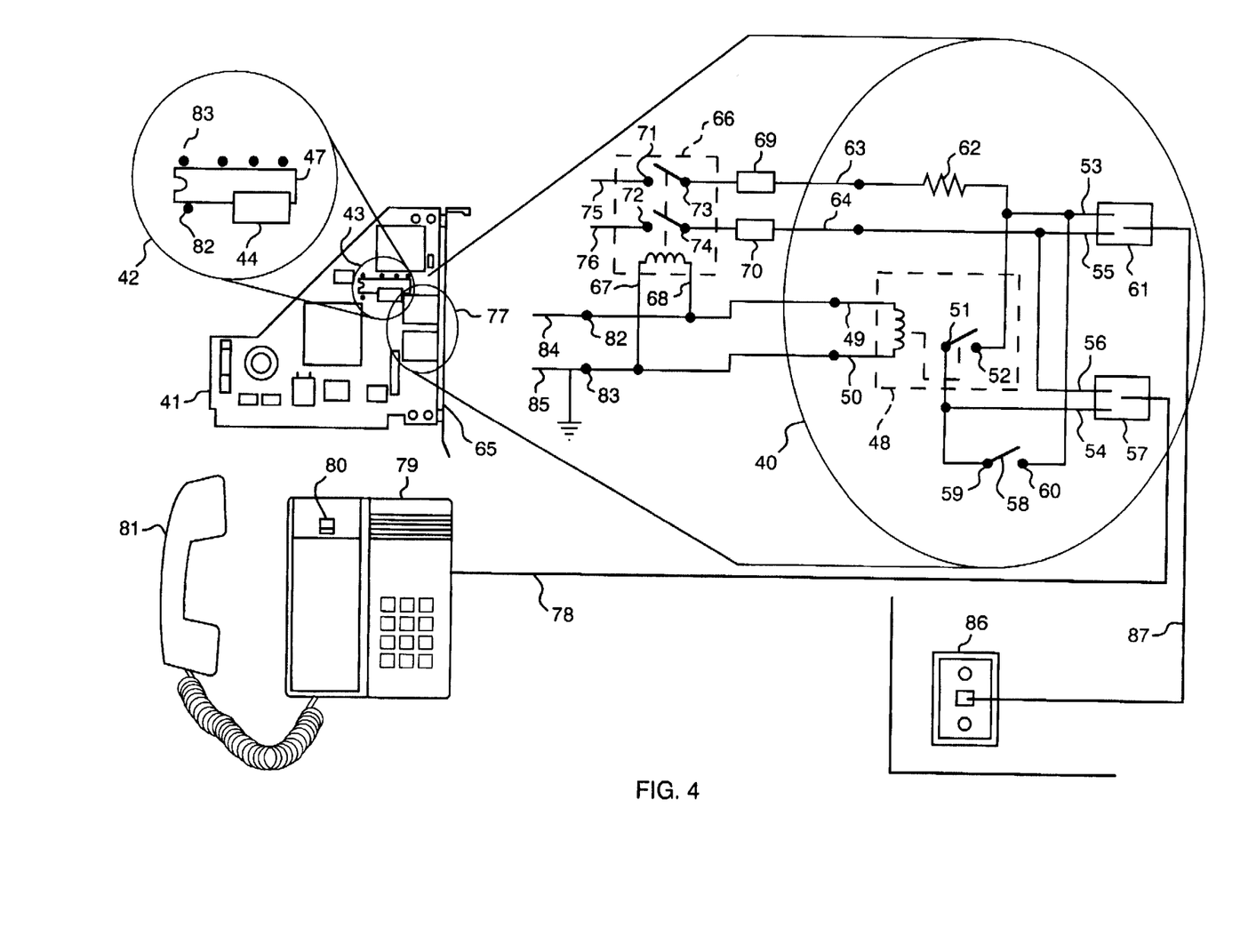
FIG. 4 shows in detail the circuit used to control connections between a modem and a telephone line according to the present invention.

FIG. 4 includes a schematic diagram of a conventional modem 41, such as a Boca Research Inc. model M0241D. An exploded view 42 of a section 43 of the modem 41 is shown. A relay 66 changes the modem's on/off hook state. When the modem 41 receives a software command to go off hook, the relay 66 is activated by a microprocessor controller (not shown) of the modem 41 which sends a five volt signal through two lines 84, 85 which are connected to coil connections 67, 68 of the relay 66. Normally open contacts 71–74 are then closed, thus completing the circuit from dial/communications circuitry connections 75, 76 of the modem 41 to circuitry connections 53, 55, respectively, of a line jack 61 of the modem 41. The line jack 61 can be connected via a conventional cable 87 to a telephone wall jack 86. Components 69, 70 are minimal passive components, the function of which is not material for purposes of this discussion but which are included herein for completeness.

When the modem 41 receives a software command to go on hook, the microprocessor of the modem 41 deactivates the relay 66 by dropping the voltage at the lines 84, 85. The contacts 71–74 are then opened and the lines 53, 55 of the line jack 61 are electrically disconnected from lines 75, 76 connected to circuitry of the modem 41. When the modem 41 is off hook, there is a five volt signal on the lines 84, 85. When the modem 41 is on hook, there is a zero voltage signal at the lines 84, 85.

It should be noted that contact points 82, 83 are connected to the lines 84, 85, respectively. An outline 47 of an IC is, in some cases, etched in white ink onto a circuit board of the modem 41 and can be used as an aid in locating the contact points 82, 83.

FIG. 4 also shows a relay 48 that is part of a modem speed dialer circuit 40. The relay 48 can be a class one one seven small general purpose five volt reed relay. When the modem 41 receives a command to go off hook, the relay 48 is activated by the microprocessor of the modem 41, which sends a five volt signal through the lines 84, 85 which are electrically connected to two coil connections 49, 50, respectively, of the relay 48. When activated, normally open contacts 51, 52 of the relay 48 are closed, thus completing the circuit from the line 54 of the phone jack 57 to the line 53 of the line jack 61. Since the line 56 is already connected to the line 55, activation of the relay 48 provides a connection that renders the phone jack 57 operational. When the modem 41 receives a command to go on hook, the relay 48 is deactivated by the microprocessor of the modem 41, which drops the voltage at the lines 84, 85. The contacts 51, 52 are then opened and the phone jack 57 is no longer operational. The relay 48 causes the phone jack 57 to be operational when the modem 41 is off hook and causes the phone jack 57 to be inoperative when the modem 41 is on hook.

The operational control of the phone jack 57 controls any telephone connected to it. A conventional telephone 79 is connected to the phone jack 57 via a cable 78. A telephone handset 81 can be physically and continuously off hook so that the telephone handset 81 becomes operational when the phone jack 57 becomes operational. Therefore the operational state of the phone jack 57 changes the operational the state of the handset 81. This is analogous to electronically changing the on/off hook state of the telephone handset 81.

Therefore, when the modem 41 is off hook and the phone jack 57 is operational, the telephone handset 81 is in effect off hook. When the modem 41 is on hook and the phone jack 57 is not operational, the telephone handset 81 is in effect on hook. In other words, when the modem 41 is off hook, the telephone handset 81 is automatically off hook, and when the modem 41 is on hook, the telephone handset 81 is automatically on hook. Therefore, the relay 48 causes the telephone handset 81 to automatically mimic the on/off hook state of the modem 41.

In order to configure a conventional modem with the circuitry as described above, it is necessary to be able to locate the relay 66 and the proper connection points of the relay 66 in order to access a signal that varies according to the on/off hook state of the modem 41. The relay 66 can be physically located and identified on the circuit board of the modem 41 in a variety of ways. Of course, in the case of the Boca Research, Inc. model M0241D, which is used in the example herein, the relay is found by locating the white ink trace on the circuit board, as described above. However, generically, one could locate the relay 66 by tracing the telephone lines 53, 55 from the line jack 61 back to the relay 66. Similarly, one could trace the lines 54, 56 of the phone jack 57 also back to the relay 66. Note that, as discussed above, there may be additional components 69, 70 which the lines pass through prior to reaching the relay 66. However, one of ordinary skill in the art should in any event have no trouble locating the relay 66. Furthermore, in many conventional models, the relay can be identified because it is a five volt double pole single throw relay. A user of ordinary skill in the art could find such a relay on the modem circuit board and, using a voltmeter or an oscilloscope, determine that the relay 66 is in fact the hook relay used to alter the on/off hook state of the modem.

A switch 58 in the circuit 40 allows the user to switch between the relayed function of the phone jack 57, as described above, or the conventional function of the phone jack 57 found in prior art computer modem/telephone configurations. With the switch 58 open, there is no connection between two contacts 59, 60 and the on/off hook state of the phone jack 57 follows the on/off hook state of the modem 41. With the switch 58 closed, the contacts 59, 60 are bridged, thus creating a completed circuit between telephone line jack 61 and the phone jack 57. Since the phone jack 57 is already connected to line jack 61, with the closing of switch 58, the phone jack 57 becomes directly connected to the line jack 61, which mimics prior art conventional modem/telephone connections. The switch 58 can be mounted on a mounting plate 65 of the modem 41 in order to be accessible to the user.

A load balancing resistor 62 is used in order to minimize the loading effect of circuitry of the modem 41 at two connection points 63, 64, especially when the modem 41 is off hook. Note that generally a conventional computer modem is not designed to be off hook simultaneously with a telephone connected to the same line. The resistor 62 provides sufficient gain at the lines 54, 56 so that the audio quality of a connected telephone is maintained. In a preferred embodiment, the value of the resistor 62 for the particular model of the modem 41 illustrated herein is approximately five hundred Ohms. As will be appreciated by one of ordinary skill in the art, instead of using a passive resistor, an active circuit could be used to regulate the loading effect on the circuitry of the modem 41.

Figure 5A:
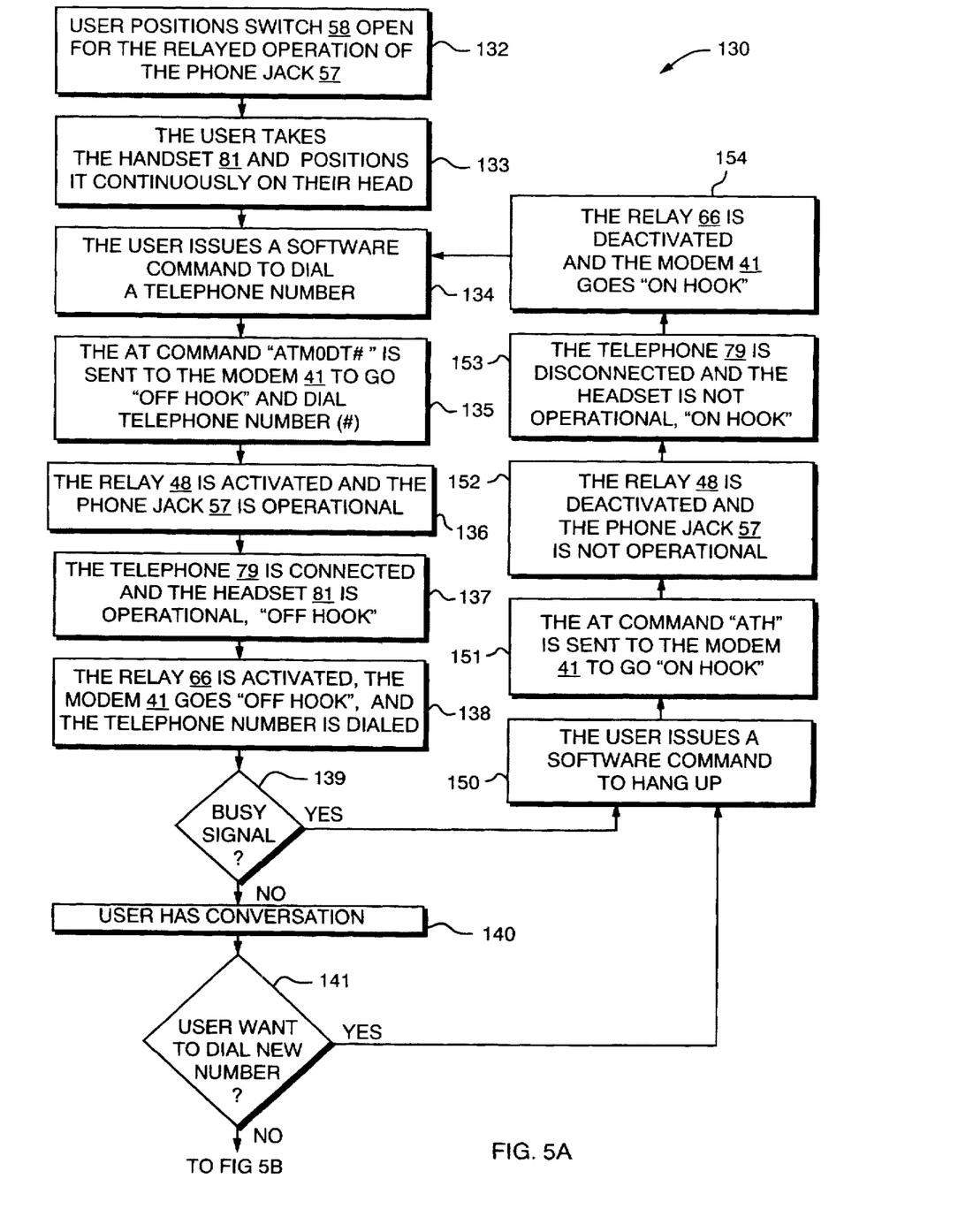
FIG. 5 is a flow chart that illustrates operation of electronic hardware and software configured according to the present invention.
Figure 5B:
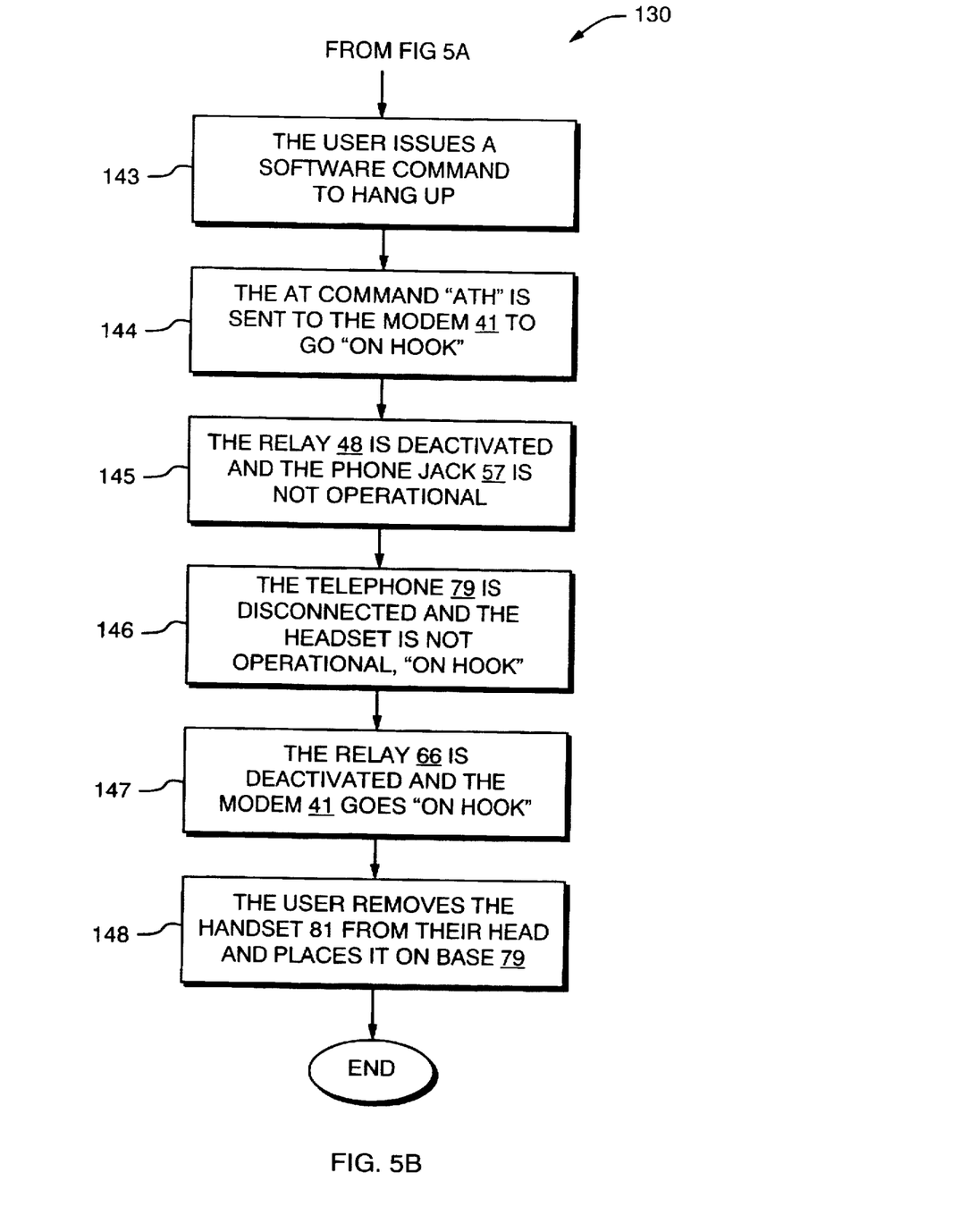

Referring to FIG. 5, a flow chart 130 illustrates operation of the circuit shown in FIG. 4 and the controlling software illustrated in FIG. 3. At a first step 132, the user positions the switch 58 to configure the circuit for relayed operation of the phone jack 57. Following the step 132 is a step 133 where the user positions the handset 81 continuously on his or her head. Following the step 133 is a step 134 where the user issues a software command to dial a telephone number, as illustrated in FIG. 3 and described in the accompanying text. Following the step 134 is a step 135 where the dial command is provided to the modem. Following the step 135 is a step 136 where the relay 48 is activated and the phone jack 57 is placed in an operational state. Following the step 136 is a step 137 where the telephone 79 is connected and the headset 81 is in an operational, off hook, state. Following the step 137 is a step 138 where the relay 66 is activated and the modem 41 goes into an off hook state and the telephone number is dialed.

Following the step 138 is a decision step 139 which determines if, upon dialing the number, the user hears a busy signal. If no busy signal is detected at the step 139, control passes from the step 139 to a step 140 where the user has a conversation with the party at the other end of the telephone connection. Following the step 140 is a test step 141 which determines if the user wants to dial a new telephone number. The user indicates his desire to dial a new telephone number or not in a conventional manner by interacting with the software. If the user does not wish to dial a new telephone number at the step 141, control passes from the step 141 to a step 143 where the user issues a software command to hang up. Following the step 143 is a step 144 where a hang up command is sent to the modem. Following the step 144 is a step 145 which indicates that the relay 48 is deactivated and the phone jack 57 is placed in an non-operational state once the modem has been hung up. Following step 145 is a step 146 where the telephone 79 is disconnected and the headset is placed in the non-operational state. Following step 146 is a step 147 where the relay 66 is deactivated and the modem 41 goes on hook. Following step 147 is a step 148 where the user removes the handset 81 from the headset and places it on the base 79. Processing terminates after the step 148.

If at the decision step 139 the user receives a busy signal, then control passes from the step 139 to a step 150 where the user issues a software command to hang up. Following the step 150 is a step 151 where the software issues a command to the modem to request that the modem 41 go on hook. Following the step 151 is a step 152 where the relay 48 is deactivated and the phone jack 57 is placed in a non-operational state. Following the step 152 is a step 153 where the telephone 79 is electrically disconnected and the headset is placed in a non-operational, on hook, state. Following the step 153 is a step 154 where the relay 66 is deactivated and the modem 41 goes into the on hook state. Following the step 154, control transfers back to the step 134 where the user issues another software command to dial a telephone number. Note that at the step 141, if the user desires to dial a new telephone number, control passes from the step 141 to the step 150 where processing continues, as described above.

Figure 6:
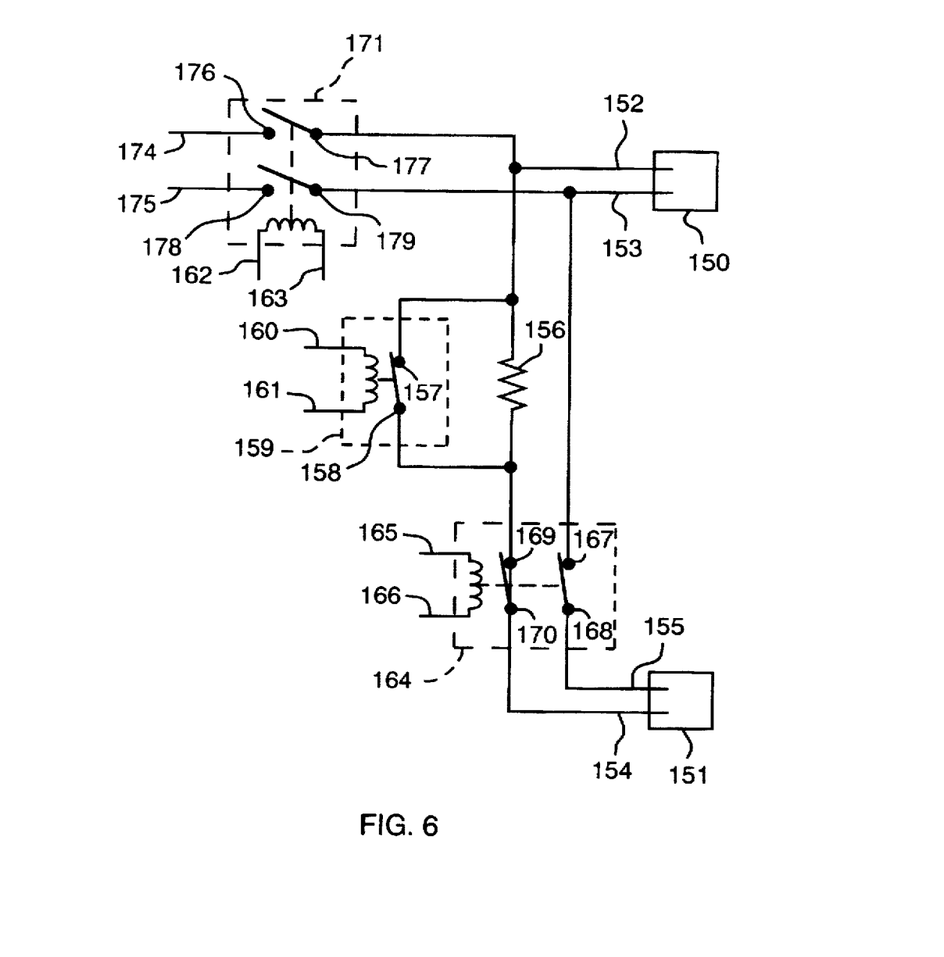
FIG. 6 shows an alternative embodiment of the present invention.

FIG. 6 shows an alternative embodiment of the present invention. A modem hook-relay 171, an attenuation relay 159 and a phone jack relay 164 are used to switch signal through the circuitry. The modem hook relay 171 is substantially similar to the hook relay 66 shown in FIG. 4 and discussed above. When the normally open modem hook relay 171 is activated, contacts 176–179 are closed to complete a circuit from two lines 174, 175 connected to dial/communications components (not shown) of the modem to lines 152, 153 of a line jack 150. When the normally closed attenuation relay 159 is activated, contacts 157, 158 are opened, causing a telephone line signal from the line 152 and modem dialing signals from the line 174 (with the relay 171 activated) to be attenuated as the signals pass through an attenuation resistor 156, through closed contacts 169, 170, to a line 154 of a phone jack 151. The phone jack relay 164 is substantially similar to the relay 48 shown in FIG. 4, except that instead of using a normally open Single Pole Single Throw (SPST) relay as disclosed in connection with the relay 48, the phone jack relay 164 is a normally closed Double Pole Single Throw (DPST) relay. The phone jack relay 164 connects or disconnects both of the lines 154, 155 of the phone jack 151 to the lines 152, 153 of the line jack 150, by the opening or closing of contacts 167–170.

Unlike the relays in FIG. 4, the relays 159, 164, 171 can be configured to be activated independently by the microprocessor of the modem, which supplies separate first, second, and third control signals, respectively, at the following relay coil contacts: for the phone jack relay 164, contacts 165, 166, for the attenuation relay 159, contacts 160, 161, and for the modem hook relay 171, contacts 162, 163. Accordingly, the attenuation relay 159 can be opened when dialing a telephone number, thus causing the signal to pass through the attenuation resistor 156 during dialing. Thereafter, the attenuation relay 159 can be closed, thus allowing the user to receive a non-attenuated voice signal. The control signals can be five volt electrical signals.

One advantage to the configuration illustrated in FIG. 6 is that conventional circuitry for the phone jack 151 and the telephone line is automatically provided when the computer is turned off or when the microprocessor of the modem has disabled use of the relayed phone jack 151. When the computer is turned off or when the microprocessor of the modem has disabled the relayed phone jack 151, the circuitry of the phone jack 151 is automatically connected to the circuitry of the line jack 150, thus allowing a connected telephone at phone jack 151 to be used conventionally for outgoing and incoming telephone calls. The embodiment illustrated in FIG. 4 requires the switch 58 to be in the closed position in order to get this conventional functionality.

Another advantage to the embodiment illustrated in FIG. 6 is that the user is spared the sound of potentially loud tones during a dialing procedure. This is accomplished by the attenuation relay 159 and the attenuation resistor 156. The attenuation relay 159 is activated by the microprocessor of the modem when the telephone number is being dialed. Activating the attenuation relay 159 opens the contacts 157, 158 and forces any signal that normally would have passed through the contacts 157, 158, to pass through the resistor 156. The resistor 156 attenuates the initial dial tone from the telephone line and attenuates the dialing tones generated by the modem. The attenuation relay 159 is deactivated by the microprocessor of the modem as soon as dialing by the modem has been completed. The attenuation relay 159 and the attenuation resistor 156 save the user from potential audio fatigue.

Also, another advantage to the embodiment illustrated in FIG. 6 is a relatively high quality connection to the telephone line. After the telephone number is dialed, with the attenuation relay 159 and the phone jack relay 164 disabled, the hook relay 171 is then disabled, thus allowing the telephone line signal to travel freely and unloaded from the telephone line jack 150 to the phone jack 151. With a connected telephone and telephone line, this results in the telephone having a high quality connection to the telephone line which produces high quality audio characteristics at the telephone handset.

The embodiment illustrated in FIG. 6 may require the microprocessor logic of the modem and perhaps other components of the modem to be designed differently than those of a conventional modem in order to perform the necessary timing and logic. Also, a method to signal the microprocessor of the modem in order to enable the relayed phone jack mode may be necessary. One possibility is to mount a switch on the modem's mounting plate in order to signal the user's desired mode. The microprocessor could read the state of the switch. Another method is to place a code in the modem initialization string sent by the software to the modem. For example, "J1" could be used in the software initialization string to signal the microprocessor that the relayed phone jack mode is desired for subsequent telephone calls. The relayed jack mode could be disabled by "J0". Therefore, the string "ATJ1" could be sent to the modem to enable jack mode and "ATJ0" could be sent to the modem to disable jack mode. The letter "J" is currently not being used by the computer industry at this time. The letter "J" could be construed as being short for "J"ack Mode. When the user wishes to disable the relayed phone jack mode, the user can issue a software command that resets the modem to its conventional factory settings, which includes a disabled jack mode, by sending the industry standard "AT&F" command to the modem. The widespread use of the "AT&F" command in data transmission software packages provides that the jack mode will not be enabled unless specifically requested by the user.

Figure 7:
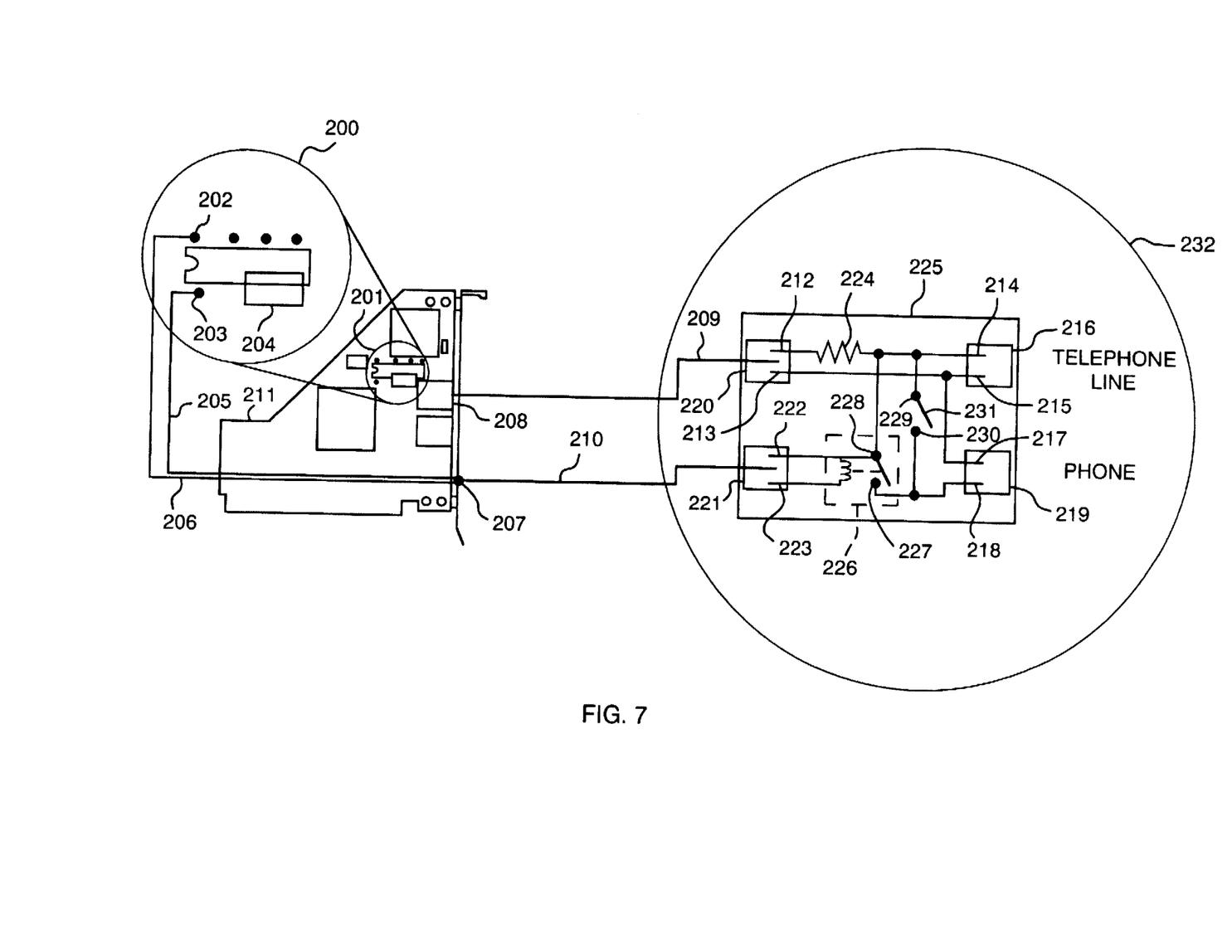
FIG. 7 shows an alternative embodiment of the present invention.

FIG. 7 illustrates a circuit that is similar to the circuit shown in view 40 of FIG. 4, but instead is used in an external design. The general function of this circuit is described above in connection with the discussion of FIG. 4 and therefore only the differences will be pointed out herein.

Components shown in a view 232 are assembled on a small circuit board 225. There are three jack connectors on the circuit board 225: a "to modem" jack 220, a telephone line jack 216 and a phone jack 219. All of the jacks 220,216,219 are compatible with an RJ-11 or equivalent type cable. The "to modem" jack 220 is connected to a telephone line jack 208 of a modem 211 via an RJ-11 cable.

A relay 226 is activated by connections between contacts 222, 223, 203, 202. The contacts 202, 203 send a microprocessor-controlled five volt signal, as discussed above in connection with FIG. 4, to a mini socket 207 that is mounted on a mounting plate of the modem 211. A two lead cable 210 has a mini plug on one end thereof that is attached to the mini socket 207 and on the other end thereof is connected to the circuit board 225 at two contacts 223, 222. A switch 231 is similar to the switch 58, discussed above in connection with FIG. 4.

Note that it is possible to practice the invention disclosed herein without using a conventional modem, but rather, by providing a device that dials the telephone without sending or receiving data via the telephone line. Note also that the invention can be practiced by replacing the mechanical relay disclosed herein by a convention equivalent, known to one of ordinary skill in the art, such as a solid state relay. The invention can be used with a variety of different types of modems, such as a PCMCIA type modem, commonly found in laptop and portable computers. Also, the circuit could be mounted on a circuit board of the modem or could be physically separate from the modem.

While the invention has been disclosed in connection with the preferred embodiments shown and described in detail, various modifications and improvements thereon will become readily apparent to those skilled in the art.

Accordingly, the spirit and scope of the present invention is to be limited only by the following claims.

What is claimed is:

1. A modem speed dialer circuit, comprising:
  a telephone jack for receiving a cable connected to a telephone;
  a line jack for receiving a cable connected to a telephone wall jack; and
  a first switch, interposed between said telephone jack and said line jack, said switch being responsive to an on/off hook signal of a modem, wherein said telephone jack is placed in an off hook state in response to said signal indicating that the modem is in an off hook state and said telephone jack is placed in an on hook state in response to said signal indicating that the modem is in an on hook state.

2. The circuit according to claim 1, further comprising:
  a second switch electrically interposed between said telephone jack and said line jack, said second switch being user actuateable to override operation of said first switch.

3. The circuit, according to claim 1, further comprising:
  a resistor for minimizing electrical loading on said line jack.

4. The circuit, according to claim 2, further comprising:
  a resistor for minimizing electrical loading on said line jack.

5. The circuit, according to claim 1, wherein said switch is a relay.

6. The circuit, according to claim 5, wherein said relay is a mechanical relay.

7. The circuit, according to claim 1, wherein the modem is an internal modem.

8. The circuit, according to claim 1, wherein the modem is an external modem.

9. A modem speed dialing circuit, comprising:
  a phone jack for receiving a cable connected to a telephone;
  a line jack for receiving a cable connected to a telephone wall jack;
  a phone jack switch, interposed between said phone jack and said line jack, said phone jack switch being responsive to a first control signal to place said phone jack in one of: an off hook state and an on hook state;
  an attenuation resistor interposed between said phone jack switch and said line jack to attenuate modem dialing signals; and
  an attenuation switch, connected in parallel to said attenuation resistor, said attenuation switch opening in order to attenuate signals provided to said phone jack in response to a second control signal provided to said attenuation switch.

10. The circuit, according to claim 9, wherein said switches are relays.

11. The circuit, according to claim 10, wherein said relays are mechanical relays.

12. The circuit, according to claim 9, further comprising:
  a modem hook relay, having a first line connected to said line jack and said attenuation relay and having a second line connected to said line jack and said phone jack relay, said modem hook relay being in a closed state in response to a third control signal that is activated only when a telephone number is dialed.

13. A modem speed dialing circuit, comprising:
  a phone jack for receiving a cable connected to a telephone;

a line jack for receiving a cable connected to a telephone wall jack;

a phone jack switch, interposed between said phone jack and said line jack, said phone jack switch being responsive to a first control signal to place said phone jack in one of: an off-hook state and an on-hook state, wherein said first control signal is asserted upon initiation of a telephone call to place said phone jack in an off-hook state;

an attenuation resistor interposed between said phone jack switch and said line jack to attenuate modem dialing signals; and an attenuation switch, connected in parallel to said attenuation resistor, said attenuation switch opening in order to attenuate signals provided to said phone jack in response to a second control signal provided to said attenuation switch.

14. The circuit, according to claim 13, wherein said first control signal is asserted to place said phone jack in an on-hook state after said phone jack is placed in an off-hook state.

15. The circuit, according to claim 13, wherein said phone jack switch is a relay.

16. The circuit, according to claim 15, wherein said relay is a mechanical relay.

17. The circuit, according to claim 13, further comprising:

a modem hook relay, having a first line connected to said line jack and said attenuation relay and having a second line connected to said line jack and said phone jack relay, said modem hook relay being in a closed state in response to a third control signal that is activated only when a telephone number is dialed.

18. The circuit, according to claim 17, further comprising:

a microprocessor that asserts the first, second, and third control signals to control the phone jack, the attenuation switch, and the modem hook relay.

19. The circuit, according to claim 18, wherein the microprocessor has a conventional mode in which the attenuation switch and phone jack switch are conducting signals to connect the phone jack to the line jack and wherein the microprocessor has a jack mode in which, at a beginning of a call and prior to dialing tones being generated, the modem hook relay and the phone jack are conducting and the attenuation switch is nonconducting, and, after dialing tones have been generated the attenuation switch and phone jack are conducting and the modem hook relay is non conducting, at the completion of a telephone call the phone jack and modem hook relay are nonconducting.

* * * * *